United States Patent Office 3,329,042
Patented July 4, 1967

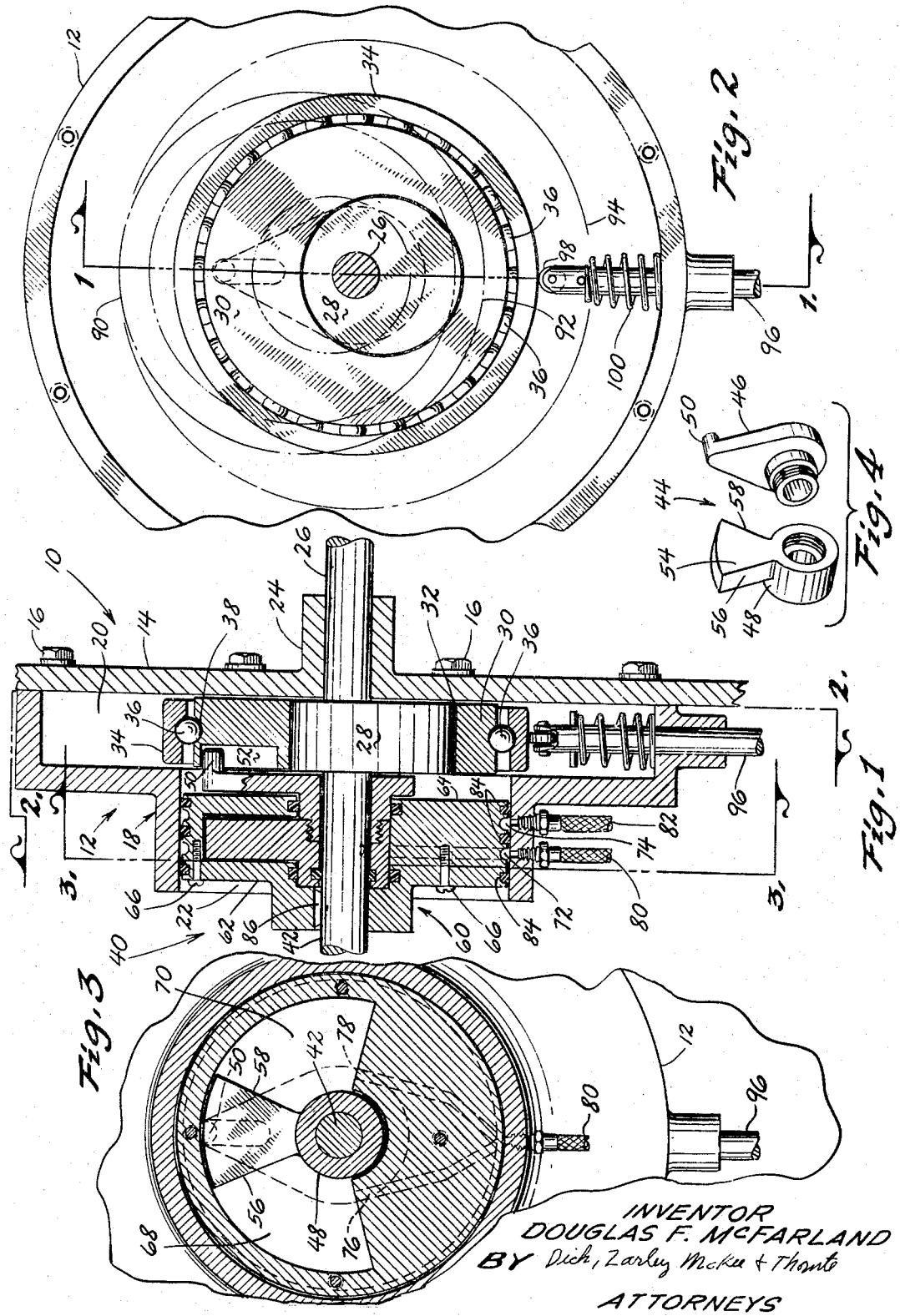

3,329,042
VARIABLE SPEED TRANSMISSION
Douglas F. McFarland, Davis City, Iowa, assignor of one-half to Smith Brothers Enterprises, Lamoni, Iowa, a corporation of Iowa
Filed Aug. 20, 1965, Ser. No. 481,256
5 Claims. (Cl. 74—571)

This invention relates to power transmissions and in particular to a variable speed-type transmission.

It is one of the principal objects of this invention to provide a variable speed transmission which will vary by degree the output power relative to the input power at any time during its operation whereby the output power may be equal to substantially the input power or gradually reduced to zero output.

Another object of this invention is to provide a variable speed transmission having a pair of rotatable cam members wherein one cam member is operatively connected to an output power means and the other cam member is connected to the input power means and the cam members may be selectively adjusted relative to each other by an actuating means.

A still further related object of this invention is to provide a variable speed transmission having a pair of cam means, one disposed within the other, wherein upon appropriate relative positioning of the cam means to each other the outer cam means will turn in a true circle and thus produce no output power and when adjusted to another position the outer cam means will rotate and move in a generally orbital or non circular path to produce output power.

A related object of this invention is to provide a variable speed transmission wherein one or more output power means may be driven by a cam means which is rotating and oscillating.

A still further related object is to provide a variable speed transmission having a pair of cam means, one disposed within the other, and a bearing means disposed around the outer cam means for frictional engagement with output power means.

A still further object of this invention is to provide a variable speed transmission having a pair of cam means, one disposed within the other which may be varied between positions wherein their rotation as a unit is in a true circle to positions following orbital non circular paths and wherein an actuating means is provided which is adapted to turn with the cam means and is hydraulically operated.

A still further object of this invention is to provide a variable speed transmission having an actuating means which includes a pair of control members, one movable within the other by hydraulic fluid pressures acting on the one cam means which in turn is coupled to one of a pair of rotating cam members.

A still further related object of this invention is to provide a variable speed transmission having an actuating means which includes a pair of control members, one rotatable within the other, and they both rotate as a unit but are selectively adjustable by hydraulic fluid pressures which may be selectively introduced to either side of the one control member within the other control member.

A still further related object of this invention is to provide a variable speed transmission having a pair of cam members, one of which is rotatable within the other and an actuating means for rotating the cam members relative to each other wherein the cam means includes a finger movable in a diametrically located groove in the other cam member whereby rotational and orbital movement of the outer cam member may be effected.

A further object of this invention is to provide a variable speed transmission which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a cross-sectional elevational view of the transmission taken along line 1—1 in FIG. 2;

FIG. 2 is a cross-sectional end view taken along line 2—2 in FIG. 1;

FIG. 3 is a fragmentary cross-sectional view taken along line 3—3 in FIG. 1; and FIG. 4 is a perspective exploded view of one of the control mmbers in the actuating assembly.

The variable speed transmission of this invention is referred to generally in FIG. 1 by the reference numeral 10 and includes a housing 12 formed by a plate member 14 secured by bolts 16 to a cylindrical member 18 having a pair of concentric chambers 20 and 22. The housing 12 remains stationary and the plate member 14 is provided with a journal 24 for an output shaft 26 which in turn is connected to a cylindrical cam member 28 disposed to rotate within the chamber 20. The circular cam 28 is secured to the shaft 26 on an axis offset from the center axis of the cam member 28 (FIG. 2). A second cam member 30 is provided and has a cylindrical opening 32 to matingly receive the circular cam 28. The actual center of the circular opening 32 is spaced fnom the axial center of the cam member 30, but as seen in FIG. 2 the cam member 30 is centered on the axis of the shaft 26 and therefore as long as the cam members 28 and 30 remain in their relative positions the cam member 30 will turn in a true circle as seen in FIG. 2.

A bearing sleeve 34 embraces the cam member 30 and rolls on a plurality of balls 36 disposed in an annular groove 38 formed in the periphery of the cam member 30.

The chamber 22 of the housing 12 encloses an actuating assembly 40 which is mounted on a shaft portion 42 which is coaxial with the shaft portion 26 and is secured to the opposite side of the cam member 28. The actuating assembly 40 includes a pair of control members, one of which is shown in FIG. 4 and referred to generally by the reference numeral 44. The control member 44 includes an actuating finger member 46 which is threadably secured to a fluid responsive member 48 wherein they are both rotatably mounted on the shaft portion 42. The finger member 46 includes a finger portion 50 which is received in a diametrically disposed groove 52 in the cam member 30. Thus the cam member 30 is free to oscillate about the common axis extending through the shafts 26 and 42.

The fluid responsive member 48 is provided with a segmental portion 54 having tapering surfaces 56 and 58.

The fluid responsive member 48 is disposed within a housing unit 60 positioned in the housing 12. The unit 60 includes a pair of sections 62 and 64 secured together by bolts 66. A pair of chambers 68 and 70 are formed in the housing 60 on opposite sides of the segmental portion 54 as seen in FIG. 3. A pair of annular grooves 72 and 74 are formed in the outer peripheral surface of the housing unit 60 and are in communication with the chambers 68 and 70 through passageways 76 and 78 respectively (FIG. 3). A pair of cables 80 and 82 are secured to the housing 60 and are adapted to be connected to a fluid pump or the like for supplying and removing fluid from the chambers 68 and 70.

To seal the fluid between the inner sidewall of the adjacent housing portion and the annular grooves 72 and 74, a trio of annular sealing elements 84 are provided in the outer peripheral edge of the housing 60. A key element 86 locks the housing 60 to the shaft 42 and therefore as the shaft 42 is rotated by a power source the housing 60 is rotated and through a fluid coupling with the fluid responsive control member 48, the control member 44 is caused to rotate and in turn rotates the outer cam member 30 by the finger portion 50 engaging the diametrical slot 52. The inner cam member 28 is rotated by the shaft portion 42. If desired, a series of transmission units may be coupled together as for example the shaft portion 26 could serve as the input power shaft for another transmission unit.

To provide oscillation of the outer cam member 30 it is only necessary to introduce fluid into one of the chambers 68 or 70 to cause the control member 44 to rotate and thereby rotate the cam members 28 and 30 relative to each other. When this is accomplished, the outer surface of the bearing 34 will move to its extreme upper position indicated by the trace line 90. Its lowermost edge is indicated by the trace line portion 92. Similarly, the lowermost extreme position of the outer surface of the bearing 34 is indicated by the trace line portion 94.

An output power means is mounted in the housing 12 and includes a reciprocating shaft 96 having a roller 98 on its inner end for engagement with the outer surface of the bearing 34. A spring 100 is provided to bias the roller into engagement with the bearing 34. It is thus apparent that a reciprocal power supply is provided by the movable shaft 96 as the cam members 30 and 28 rotate as a unit in the orbital paths indicated by the trace lines in FIG. 2. It is to be further appreciated that any number of reciprocating output shafts 96 may be disposed around the periphery of the housing 12.

Also readily apparent is that the stroke of the output shaft 96 may be varied from the extreme of the trace lines 90 and 94 to nothing by simply rotating the segmental portion 54 of the control member 48 within the chambers 68 and 70 in the housing 60. This can be accomplished very gradually regardless of the speed of rotation of the shafts 42 and 26. Thus a most effective variable speed transmission has been provided.

Some changes may be made in the construction and arrangement of my variable speed transmission without departing from the real spirit and purpose of my invention, and it is my intention to cover by my claims, any modified forms of structure or use of mechanical equivalents which may be reasonably included within their scope.

I claim:

1. A variable speed transmission, comprising, a drive shaft, a circular member rigidly mounted on said shaft and having a center axis offset from the longitudinal axis of said shaft, a second circular member having a circular opening with a center axis offset from the center axis of said second circular member, said first circular member rotatably disposed in said circular opening, actuating means for selectively rotating said first and second members relative to each other as they are rotated as a unit, and said drive shaft adapted to be rotated whereby said first and second circular members are rotated, and output means operatively engaging the outer peripheral side of said second member, said actuating means including a pair of control members, one of said control members being rotatable with said first circular member and said other control member being rotatable with said second circular member, means for rotating said control members relative to each other as said control members and first and second circular members are rotated as a unit, and said one control member has a chamber and said second control member has a movable portion in said chamber, said means for rotating said control members relative to each other includes a hydraulic system for selectively introducing and withdrawing fluid from said chamber to move said movable portion in said chamber and thereby rotate said first and second members relative to each other.

2. A variable speed transmission, comprising, a drive shaft, a first member mounted on said shaft, a second member being rotatable relative to said first member, actuating means for selectively rotating said first and second members relative to each other as they are rotated as a unit, and said drive shaft adapted to be rotated whereby said first and second members are rotated, and output means operatively engaging the outer peripheral side of said second member, said actuating means includes a pair of control members, one of said control members being rotatable with said first member and said other control member being rotatable with said second member, and means for rotating said control members relative to each other as said control members and first and second members are rotated as a unit, and said one control member has a chamber and said second control member has a movable portion in said chamber, said means for rotating said control members relative to each other includes a hydraulic system for selectively introducing and withdrawing fluid from said chamber to move said movable portion in said chamber and thereby rotate said first and second members relative to each other.

3. A variable speed transmission, comprising, a drive shaft, a circular member rigidly mounted on said shaft and having a center axis offset from the longitudinal axis of said shaft, a second circular member having a circular opening with a center axis offset from the center axis of said second circular member, said first circular member rotatably disposed in said circular opening, actuating means for selectively rotating said first and second members relative to each other as they are rotated as a unit, and said drive shaft adapted to be rotated whereby said first and second circular members are rotated, and output means operatively engaging the outer peripheral side of said second member, said actuating means includes a pair of control members, one of said control members being rotatable with said first circular member and said other control member being rotatable with said second circular member, and means for rotating said control members relative to each other as said control members and first and second circular members are rotated as a unit, said second member has a diametrical slot formed in one side thereof and said other control member has a finger portion movably received in said slot whereby as said control members are rotated relative to each other said first and second members are rotated relative to each other.

4. A variable speed transmission, comprising, a drive shaft, a circular member rigidly mounted on said shaft and having a center axis offset from the longitudinal axis of said shaft, a second circular member having a circular opening with a center axis offset from the center axis of said second circular member, said first circular member rotatably disposed in said circular opening, actuating means for selectively rotating said first and second members relative to each other as they are rotated as a unit, and said drive shaft adapted to be rotated whereby said first and second circular members are rotated, and output means operatively engaging the outer peripheral side of said second member, said actuating means includes a pair of control members, one of said control members being rotatable with said first circular member and said other control member being rotatable with said second circular member, and means for rotating said control members relative to each other as said control members and first and second circular members are rotated as a unit, said one control member has a chamber and said second control member has a movable portion in said chamber, said movable portion being movable between opposite ends of said chamber, said means for rotating said control members relative to each other includes a hydraulic system for selectively introducing and withdrawing fluid from said chamber on opposite sides of said movable portion to move said movable portion between the opposite ends of said chamber and thereby rotate said first and second members relative to each other.

5. The structure of claim 4 wherein said hydraulic system includes said one control member being mounted in a housing and having a pair of annular grooves formed in the outer peripheral edge facing the inside of said housing, sealing means separating said annular grooves, a passageway for each of said grooves connecting them to said chamber on opposite sides of said movable portion.

References Cited
UNITED STATES PATENTS

| | | | |
|---|---|---|---|
| 2,335,645 | 11/1943 | Celio | 74—571 |
| 2,592,237 | 4/1952 | Bradley | 74—571 |
| 2,900,839 | 8/1959 | Mackintosh | 74—571 |

FRED C. MATTERN, JR., *Primary Examiner.*

W. S. RATLIFF, *Assistant Examiner.*